United States Patent Office 3,480,474

Patented Nov. 25, 1969

3,480,474
METHOD FOR PREPARING SEMICONDUCTOR CRYSTALS

Reimer Emeis, Ebermannstadt, and Wolfgang Weber, Pretzfeld, Germany, assignors to Siemens Aktiengesellschaft, Berlin, Germany, a corporation of Germany No Drawing. Filed Mar. 2, 1967, Ser. No. 619,917
Claims priority, application Germany, Mar. 4, 1966, S 102,364
Int. Cl. B44d *1/02;* C23c *9/00*
U.S. Cl. 117—224 7 Claims

ABSTRACT OF THE DISCLOSURE

A process for treating semiconductor slices, particularly silicon, which comprises contacting etched and rinsed crystals with an aqueous boron-containing alkali hydroxide solution. The etching and rinsing usually follows slicing and lapping operations.

Semiconductor discs or slices, severed from an essentially monocrystalline semiconductor rod, are frequently lapped plane in a lapping machine and a step toward producing semiconductor components. It is known from German published document 1,199,098 to remove the crystal structure, damaged by lapping, directly under the surface of the semiconductor crystals by etching with a hot potassium hydroxide solution, a cold sodium or potassium hydroxide solution or a CP etching solution, comprising a mixture of 40% hydrofluoric acid and fuming nitric acid, in a 1:1 ratio. Following the etching process, doping material may be diffused into the semiconductor crystal, for producing p-n junctions, for example. The p-n junctions which were thus produced sometimes have a reduced blocking capacity.

Our invention is based upon the recognition that one of the reasons for the impairment of the blocking capacity is attributable to traces of heavy metals, which are present in the semiconductor crystals in otherwise imperceptible quantities. We suspect that these trace impurities, if not already present in the raw crystal rod, come from tools used during the etching process, or the impurities may also appear on the surface of the disc-shaped semiconductor crystal from within the crystal the first time as a result of heat processing, for example diffusion. It is known that heavy metal atoms may form recombination centers in the crystal lattice, or may act as donors or acceptors, thus influencing the electrical properties of semiconductor components in an unpredictable manner. An undesirable precipitation of heavy metal islands may occur in the crystal during the cooling process which follows the diffusion process as often the solubility of the heavy metals in the semiconductor material decreases sharply at a drop in temperature. Such heavy metal islands, if occurring in the region of p-n junctions, may considerably reduce their blocking capacity. By eliminating these causes, our invention overcomes this disadvantage.

To this end, our invention relates to a method for processing semiconductor crystals, particularly silicon crystals. According to the invention, crystals etched and rinsed in a known manner, are contacted with an aqueous solution of an alkali hydroxide-containing boron, until such time as a gelatinous surface coating forms. This coating is then solidified through heating. We have found that heavy metal impurities have greater solubility in such surface coatings than they do in semiconductor materials, so that among other things, this coating acts as a getter for the heavy metal impurities. A coating produced by means of an aqueous solution of an alkali hydroxide, containing tri-valent, positively charged boron, has proved particularly effective. It is economical in both time and money to sometimes have the concentration of the alkali hydroxide such that upon prolonging the contacting times, an etching effect is obtained which is adequate both to remove the impurities from the surface and to reduce the disturbed surface structure portions. As in normal etching processes, the higher the concentration of the etching solution, the shorter the processing time. The required etching periods usually suffice for also producing the gettering coating, even when the etching solution contains a small amount of boron. It is, however, essential to protect the still gelatinous coating from being damaged, until the latter is solidified through heating and, thus, becomes less sensitive.

The invention will be further disclosed by means of a specific embodiment.

To produce semiconductor components, such as rectifiers, transistors or thyristors, disc-shaped silicon crystals from 200 to above 400$\mu$ thickness are severed from an essentially monocrystalline silicon rod, 10–30 mm. in diameter, and lapped planar in a lapping machine to a thickness of between 150 and 300$\mu$. Thereafter, the crystal structure, disturbed from the severing and lapping processes and extending below the surface of the silicon crystals down to a depth of approximately 50$\mu$, is etched away. The etchant may be an acid or an alkaline etching liquid, for example a CP etching solution or an aqueous solution of sodium hydroxide or potassium hydroxide. Following the etching process, the silicon crystals are rinsed in water.

Prior to a diffusion process for introducing a defined amount of doping material, the silicon crystals are treated with an aqueous boron-containing alkali hydroxide solution, for example potassium hydroxide or sodium hydroxide. The semiconductor crystals may be dipped into this solution and rinsed with the same. This treatment produces a gelatinous surface coating upon the semiconductor crystals. This coating is subsequently solidified through heating. During the diffusion process, the coating getters not only the disturbing heavy metal atoms which reach the surface of the silicon crystal during the mechanical pre-processing and during the etching process, but also those heavy metal impurities which evaporate during the diffusion process, possibly for example from the walls of the diffusion vessel which may be an evacuated and sealed quartz ampule. Even the impurities which may have been present in the silicon rod prior to cutting off the silicon crystal slices are gettered by this coating, during the diffusion process, and removed from the silicon crystals.

The gelatinous surface coating is preferably produced by treating the semiconductor crystals with a solution which is prepared from 200 parts water, 1 to 200 parts alkali hydroxide, e.g. sodium or potassium hydroxide, and 1 to 20 parts boron oxide ($B_2O_3$). All parts are by weight. This solution may be at room temperature, i.e. approximately from 10°–30° C., since at this temperature, the alkali hydroxide solution hardly attacks the undisturbed crystal structure of the semiconductor crystals. The gelatinous surface coating is preferably solidified through heating of the semiconductor crystals to a temperature of above 50° C., preferably 90° C. Heating may be effected, for example, in a furnace in the presence of air. Following solidification of the surface coating, the semiconductor bodies may be subjected to the usual diffusion process for inserting doping substances, for example in an evacuated and sealed quartz ampule.

A gelatinous surface coating having favorable gettering qualities is also obtained by treating the semiconductor crystals with an aqueous solution of alkali hydroxide, for example sodium or potassium hydroxide, which is previously or simultaneously contacted with boron oxide-containing glass. To this end, either a boron oxide-containing glass vessel is used, or pieces of boron oxide-containing glass are added to an alkali hydroxide solution contained in a synthetic vessel. Glass containing the following composition by weight was found to be particularly suitable: 75% $SiO_2$; 6.8% $Na_2O$; 0.4% $K_2O$; 1.1% CaO; 3.4% BaO; 5.7% $Al_2O_3$; 7.5% $B_2O_3$; and 0.1% $Fe_2O_3$.

After removing the crystal structure, disturbed by lapping and severing, from below the surface of the semiconductor crystals, by means of an etching solution, it is sometimes advisable to rinse well the semiconductor crystals in water, possibly using ultrasonics, prior to the start of production of the gelatinous surface coating. After producing the gelatinous surface coating, however, the semiconductor crystals should neither be too intensely rinsed, nor wiped, so that the surface coating remains unimpaired. If necessary, it is recommendable to subject the semiconductor bodies after the rinsing process once more to a treatment by means of a solution, as aforedescribed, before the surface coating is solidified by heat. This after-treatment may also be effected with a solution being at room temperature, i.e. approximately between 10° C. to 30° C., whereby the disturbed crystal structures of the semiconductor will be removed, but not damage the undisturbed lattices of unimpaired crystal structures.

If the disc-shaped semiconductor crystals have an undisturbed surface to begin with, i.e. if they are obtained, for example, through pyrolytic precipitation of semiconductor material, then the alkali hydroxide portion in the solution, used to prepare the semiconductor crystals, need only be sufficient to ensure the formation of the gelatinous surface coating.

The features, working processes and directions derived from the above disclosure may be considered, insofar as not previously known, to be valuable inventive improvements, individually as well as in the combination disclosed here for the first time.

We claim:

1. In methods of treating semiconductor crystals, more particularly silicon crystals, by a diffusion process, which comprises etching and rinsing the crystals, the improvement which comprises contacting the crystals with an aqueous solution of an alkali hydroxide, which contains boron, until a gelatinous surface coating forms which is subsequently solidified by heating.

2. The method of claim 1, wherein the solution used contains tri-valent, positively charged boron.

3. The method of claim 2, wherein the concentration of the alkali hydroxide and the period of contacting are such that an etching effect is obtained which is adequate to clean the surface of foreign bodies and to remove disturbed surface structure portions.

4. The method of claim 3, wherein the solution contains by weight 200 parts water, 1 to 200 parts alkali hydroxide and 1 to 20 parts boron oxide.

5. The method of claim 4, wherein the coating produced is solidified by heating the crystals to a temperature between 50 and 300° C.

6. The method of claim 3, wherein a solution containing by weight 200 parts water and 1 to 200 parts alkali hydroxide is contacted with boron oxide-containing glass.

7. The method of claim 6, wherein the coating produced is solidified by heating the crystals to a temperature between 50 and 300° C.

References Cited

UNITED STATES PATENTS 2,822,250 2/1958 Nobel ---------------- 156—17

FOREIGN PATENTS 909,228 10/1962 England.

WILLIAM L. JARVIS, Primary Examiner

U.S. Cl. X.R.

117—118; 156—17; 148—33.3